United States Patent
Rahman et al.

(10) Patent No.: US 7,946,763 B2
(45) Date of Patent: *May 24, 2011

(54) MULTI-LAYERED THERMAL SENSOR FOR INTEGRATED CIRCUITS AND OTHER LAYERED STRUCTURES

(75) Inventors: Aquilur Rahman, Round Rock, TX (US); Lloyd Andre Walls, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 12/363,353

(22) Filed: Jan. 30, 2009

(65) Prior Publication Data

US 2009/0135883 A1    May 28, 2009

Related U.S. Application Data

(63) Continuation of application No. 11/375,474, filed on Mar. 14, 2006, now Pat. No. 7,510,323.

(51) Int. Cl.
    G01K 7/16     (2006.01)
    H01L 23/48    (2006.01)
(52) U.S. Cl. ....... 374/185; 374/137; 338/22 R; 702/130; 257/457
(58) Field of Classification Search .................. 374/178, 374/163, 183, 185, 100, 166, 112, 114, 110, 374/208, 170, 29, 30, 137; 702/130–136; 257/37, 38, 39, 758; 438/597; 338/25, 28, 338/22 R
    See application file for complete search history.

(56) References Cited

U.S. PATENT DOCUMENTS

| | | | |
|---|---|---|---|
| 4,869,598 A | 9/1989 | McDonald | |
| 5,475,264 A | 12/1995 | Sudo et al. | |
| 5,602,392 A | 2/1997 | Owen et al. | |
| 5,792,377 A | 8/1998 | Belcher et al. | |
| 5,939,789 A | 8/1999 | Kawai et al. | |
| 6,190,040 B1 * | 2/2001 | Renken et al. | 374/185 |
| 6,238,085 B1 | 5/2001 | Higashi et al. | |
| 6,403,463 B1 | 6/2002 | Suyama | |

(Continued)

FOREIGN PATENT DOCUMENTS

GB    2376565 A    4/1999

(Continued)

*Primary Examiner* — Gail Verbitsky
(74) *Attorney, Agent, or Firm* — Yee & Associates, P.C.; Diana R. Gerhardt

(57) ABSTRACT

A compact resistive thermal sensor is provided for an integrated circuit (IC), wherein different sensor components are placed on different layers of the IC. This allows the lateral area needed for the sensor resistance wire on any particular IC layer to be selectively reduced. In a useful embodiment, a plurality of first linear conductive members are positioned in a first IC layer, in spaced-apart parallel relationship with one another. A plurality of second linear conductive members are similarly positioned in a second IC layer in spaced-apart parallel relationship with one another, and in orthogonal relationship with the first linear members or in parallel with existing wiring channels of the second IC layer. Conductive elements respectively connect the first linear members into a first conductive path, and the second linear members into a second conductive path. A third conductive element extending between the first and second layers connects the first and second conductive paths into a single continuous conductive path, wherein the path has a resistance that varies with temperature. A device responsive to an electric current sent through the continuous path determines temperature of the path from the path resistance. Two or more of the thermal sensors could be connected in series, for use in measuring critical IC circuits.

7 Claims, 6 Drawing Sheets

U.S. PATENT DOCUMENTS

| | | |
|---|---|---|
| 6,431,750 B1 | 8/2002 | Haberbusch et al. |
| 6,534,868 B2 | 3/2003 | Sekiguchi |
| 6,668,230 B2 * | 12/2003 | Mansky et al. ............... 506/39 |
| 6,841,843 B2 | 1/2005 | Ohkubo et al. |
| 6,919,226 B2 | 7/2005 | Ogawa et al. |
| 7,122,830 B2 | 10/2006 | Ishikawa et al. |
| 7,188,412 B2 | 3/2007 | Yazaki et al. |
| 7,193,311 B2 | 3/2007 | Ogawa et al. |
| 7,253,091 B2 | 8/2007 | Brewer et al. |
| 7,510,323 B2 * | 3/2009 | Rahman et al. ............... 374/163 |
| 2002/0096768 A1 * | 7/2002 | Joshi ............................ 257/750 |
| 2003/0234449 A1 * | 12/2003 | Aratani et al. ................ 257/758 |
| 2004/0094840 A1 | 5/2004 | Sakamoto et al. |
| 2004/0188795 A1 | 9/2004 | Ohkubo et al. |
| 2005/0161822 A1 | 7/2005 | Ohkubo et al. |
| 2005/0167842 A1 | 8/2005 | Nakamura et al. |
| 2005/0173775 A1 | 8/2005 | Kawahara et al. |
| 2005/0186768 A1 | 8/2005 | Sugaya et al. |
| 2005/0238080 A1 * | 10/2005 | Wolkin et al. .................. 374/29 |
| 2006/0043595 A1 * | 3/2006 | Aratani et al. ................ 257/758 |
| 2006/0145347 A1 | 7/2006 | Aida |
| 2006/0220227 A1 | 10/2006 | Marro |
| 2007/0145362 A1 | 6/2007 | Wolkin et al. |
| 2007/0187717 A1 | 8/2007 | Sadaka et al. |
| 2008/0002755 A1 * | 1/2008 | Raravikar et al. ............. 374/100 |
| 2008/0088033 A1 | 4/2008 | Humpston et al. |
| 2008/0169514 A1 * | 7/2008 | Hsueh et al. .................. 257/379 |
| 2009/0174520 A1 * | 7/2009 | Wada et al. .................... 338/25 |
| 2010/0206624 A1 * | 8/2010 | Feichtinger ................... 174/260 |

FOREIGN PATENT DOCUMENTS

| | | |
|---|---|---|
| JP | 61216465 A | 9/1986 |
| JP | 20040304070 A | 9/2004 |

* cited by examiner

MULTI-LAYERED THERMAL SENSOR FOR INTEGRATED CIRCUITS AND OTHER LAYERED STRUCTURES

This application is a continuation of application Ser. No. 11/375,474, filed Mar. 14, 2006 now U.S. Pat. No. 7,510,323, status allowed.

BACKGROUND OF THE INVENTION

1. Field of the Invention

The invention disclosed and claimed herein generally pertains to a compact thermal sensor apparatus for monitoring temperature in an integrated circuit (IC) or other semiconductor package. More particularly, the invention pertains to sensor apparatus of the above type that comprises two or more components, wherein each component is located on a different layer of the IC. Even more particularly, the invention pertains to a sensor apparatus of the above type wherein wiring channels for IC functions unrelated to the thermal sensor can readily be routed through any of the sensor components.

2. Description of the Related Art

It is generally important to monitor the internal temperature of an integrated circuit such as a microprocessor or the like. Typically, an analog thermal sensor for integrated circuits comprises a metal line or wire of substantial length and a fixed width. From the designed length of the sensor wire and the resistivity of the material used therefor, the over-all resistance of the sensor wire can easily be measured, by passing a known current through the wire and measuring the voltage thereof. Moreover, a material is selected for the sensor wire that has a resistance which will change as a linear function of temperature, over a specified temperature range. From the linear relationship between resistance and temperature, it is comparatively easy to determine temperature proximate to the sensor from the measured sensor resistance, and also to predict other corresponding values of resistance to temperature. The accuracy and sensitivity of the temperature measurement is determined primarily by the physical properties of the metal used for the sensor wire, and by the cross-section and length of the wire sensor. Variations in the cross-section of the sensor wire are dictated by variations in the wire fabricating process.

In the past, a wire thermal sensor of the above type has generally been constructed by placing the entire wire on a single metal layer or level of an IC, in a serpentine pattern or configuration. ESD diodes are placed at either end of the sensor wire, to protect the IC semiconductor from high voltage transients. Such prior art arrangement is shown in FIG. 1, as described hereinafter. However, this arrangement has a number of drawbacks. The long length of the serpentine line, when constructed on only a single layer of the IC, causes a large amount of the layer area to be used for the sensor circuit. Thus, the sensor configuration can significantly reduce the wiring channels on that layer and hence, the sensor cannot be an integral part of a circuit being measured.

Moreover, it would often be useful to be able to position a temperature sensor at any desired location in an IC. For example, there could be concern of a hot spot developing at a particular IC location, due to substantial power dissipation. However, because of the limitations of currently available sensors, it could be difficult to place one of such sensors at the particular location, in order to monitor location temperature.

In a prior art thermal sensor of the above type, there are conflicting requirements in that the sensor wire needs to be narrow enough to provide enough resistance over-all, but must still be wide enough that the sensor itself does not generate heat. Also, the use of narrow width lines or wires makes the sensor more susceptible to variations in the wire fabrication process, since process variations tend to vary by some percentage around a mean value. Presently, there is an optimum range of resistance for a sensor of this type. If the value is too high, the value cannot be measured by available measurement tools. If the resistance is too low, it becomes too insensitive. Process variations limit how close the design can be made to the high side of the optimum resistance range.

It would be desirable to provide a thermal sensor for integrated circuits that could overcome the above problems and disadvantages found in the prior art.

SUMMARY OF THE INVENTION

The invention is directed to a compact thermal sensor for an integrated circuit or other multi-layered structure, as described hereinafter, wherein prior art problems of the above type are overcome by placing different components of the sensor on two or more different metal layers of the IC or other structure. This allows the lateral area needed for the sensor resistance wire on any particular layer to be selectively reduced. Moreover, other wires not related to the sensor are allowed to pass through the sensor component on a given IC layer, and such wires can be shielded laterally. Thus, the above configuration provides a thermal sensor for an IC that significantly increases utility of space in the IC.

In one useful embodiment of the invention, a first conductive trace is located in a first metal layer within a plurality of layers. A second conductive trace is located in a second metal layer within the plurality of layers, wherein at least one non-conductive layer in the plurality of layers is located between the first metal layer and the second metal layer. An electrical connector is provided to connect the first conductive trace and the second conductive trace to each other, to form the thermal sensor.

In a further embodiment, the first and second conductive traces comprise first and second linear conductive members, respectively. One or more channels are formed in at least one of the first and second layers, each of the channels being placed between linear conductive members of the layer in which the channel is formed, each of the channels being disposed to receive conductors pertaining to functions of an IC or other structure in which the sensor resides. Usefully, at least one of the channels is disposed to receive conductors that comprise one or more wires for carrying information, and one or more additional wires for shielding the information carrying wires. In a useful arrangement, a plurality of second linear conductive members are aligned in orthogonal relationship with the first linear conductive members.

In another useful arrangement, the electrical connector comprises first and second conductive elements, wherein each first conductive element comprises a first end connector located in the second layer and two associated via links. Similarly, each second conductive element comprises a second end connector located in the first layer and two associated via links.

In yet another embodiment, each of the first end connectors is placed into one of two arrays located in the second layer, wherein the second linear members are respectively located between the two arrays of first end connectors. In like manner, each of the second end connectors is placed into one of two arrays located in the first layer, the first linear members being respectively located between the two arrays of second end connectors. The thermal sensor may usefully be connected in series with one or more sensor circuits that are each substantially similar to the thermal sensor, in order to enable temperature of critical circuits of an associated structure to be measured. The thermal sensor may also have a resistance that varies linearly with variation of an adjacent temperature, over a specified temperature range.

DETAILED DESCRIPTION OF THE PREFERRED EMBODIMENT

Figure 1:
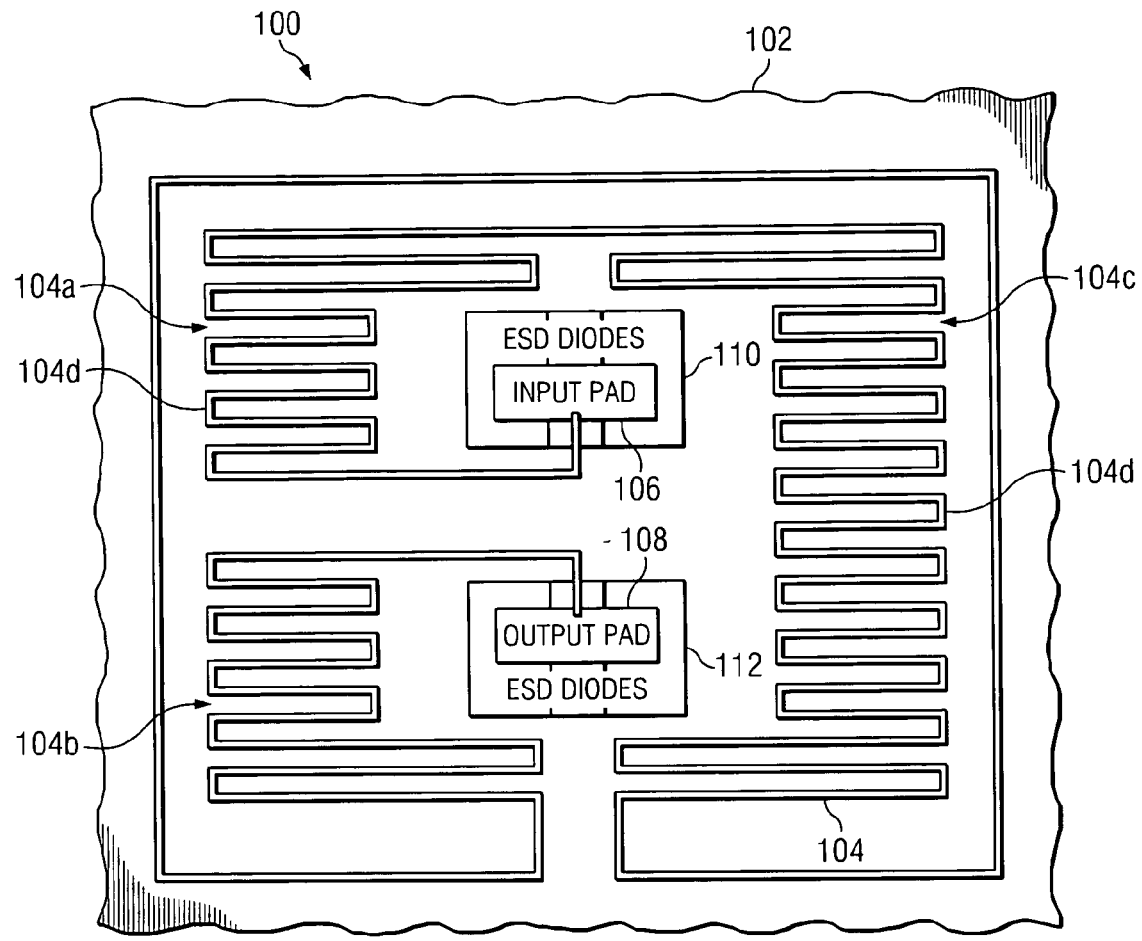
FIG. 1 is an overhead view showing a prior art thermal sensor for an IC.

Referring to FIG. 1, there is shown a prior art resistive thermal sensor of the type described above, formed on a metal layer 102 of an IC semiconductor that is not otherwise shown. Sensor 100 comprises a continuous wire or line 104 formed of conductive metal. Herein, the terms "wire", "line" and "trace" are used interchangeably, to refer to a narrow conductive path formed on one of the metal layers of an IC.

As discussed above, wire 104 must be of substantial length in order to have a resistance that is high enough to be useful in determining temperature adjacent to sensor 100. Thus, in order to provide sufficient wire length, wire 104 is placed on layer 102 in a serpentine pattern, as shown by FIG. 1 and discussed above. The pattern comprises several larger loops 104a, 104b and 104c, wherein each of the larger wire loops comprises a number of smaller or tighter wire loops 104d. As stated above, sensor wire 104 must be narrow enough to have sufficient resistance over its length, but must also be wide enough that it is not heated by the current it is carrying. Temperature measurements would, of course, be distorted if operation of the thermal sensor added heat to the IC being monitored.

FIG. 1 further shows the wire 104 having input and output ends, which are respectively connected through input and output pads 106 and 108 to electrostatic (ESD) diodes 110 and 112 to protect the IC from high voltage transients. It can readily be appreciated from FIG. 1 how the serpentine arrangement of FIG. 1 tends to act as a barrier in preventing conductors or conductive paths associated with other circuits of the IC from being placed across layer 102. Such conductors may have to be routed to other layers, in order to get around the prior art thermal sensor 100.

Figure 2:
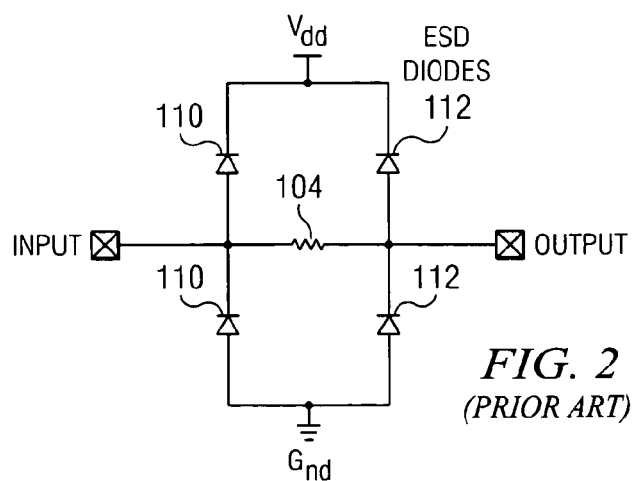
FIG. 2 is a schematic diagram showing a circuit using the prior art thermal sensor of FIG. 1.

FIG. 2 shows diodes 110 and 112 for thermal sensor 100 connected between a voltage source ($V_{dd}$) and a ground connection ($G_{nd}$).

Figure 3:
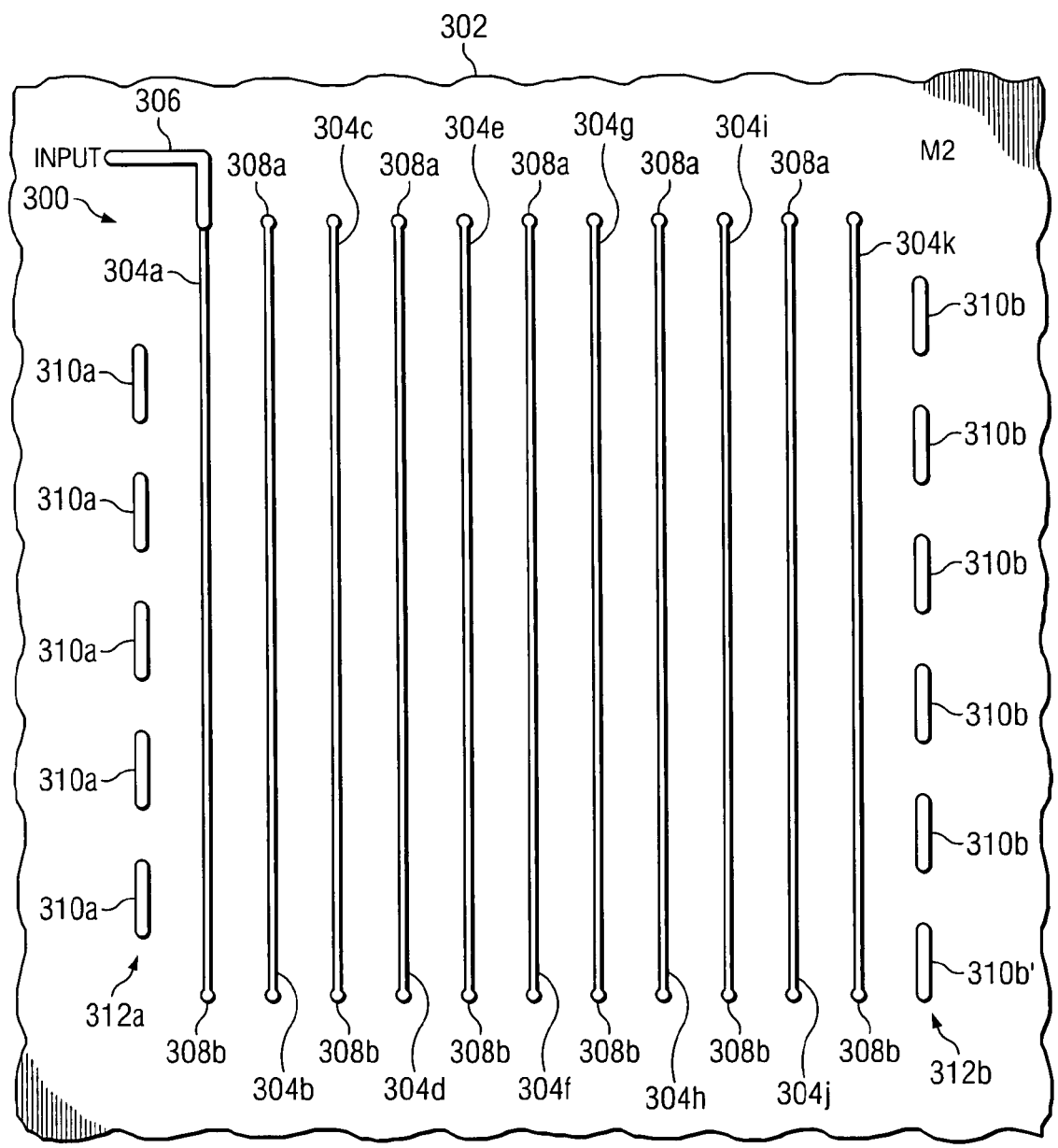
FIGS. 3 and 4 are overhead views respectively showing components for an embodiment of the invention, wherein each component lies in a different metal layer of an integrated circuit (IC).

Referring to FIG. 3, there is shown a resistor component 300 for a thermal sensor, wherein the component 300 is formed in accordance with an embodiment of the invention on a metal layer 302 of an integrated circuit (IC). Layer 302, for example, may comprise the M2 layer of the associated IC.

Figure 4:
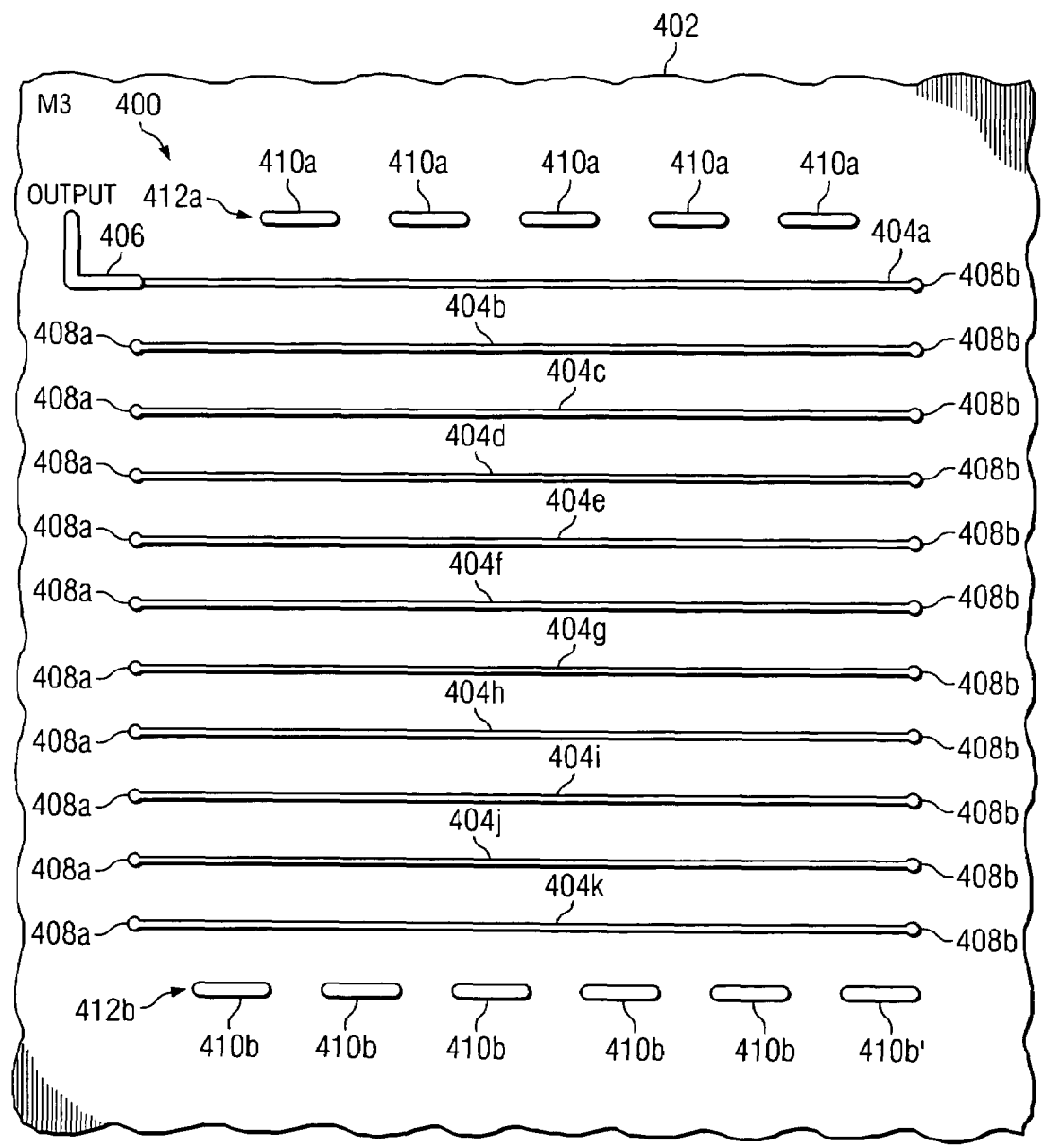

Similarly, FIG. 4 shows a resistor component 400 for the thermal sensor formed on a metal layer 402 of the same IC. Layer 402 may comprise the M3 layer of the IC, so that it is the next metal layer of the IC below the M2 layer 302. A layer of non-conductive material, such as quartz or a selected oxide, is located between the metal layers M2 and M3. As described hereinafter, resistor components 300 and 400 are joined together to form a complete resistive thermal sensor comprising an embodiment of the invention, for use with the associated IC.

For purposes of illustration, the embodiment of the invention disclosed herein is shown for use with an integrated circuit. However, it is to be emphasized that the invention is by no means limited to such use. To the contrary, it is anticipated that embodiments of the invention can be used for thermal sensing in virtually any type of layered or multi-layered structure that comprises alternating conductive and non-conductive layers. In addition to integrated circuits, such structures can include, without limitation, substrate modules, layered chip carriers, cards and printed circuit boards.

Referring again to FIG. 3, there is shown resistor component 300 comprising a number of narrow linear wires or traces 304a-k, each formed of an electrically conducting material such as M2 metal. The linear traces are respectively placed on layer 302 so that they are in spaced apart, substantially parallel relationship with one another. FIG. 3 shows eleven traces 304a-k for purposes of illustration, but other embodiments of the invention may use different numbers of such traces.

FIG. 3 further shows an input link 306 formed on M2 layer 302, input 306 being connected to an end of linear trace 304a. Each of the other ends of traces 304a-k is connected to either a via link 308a or 308b. The via links are made by forming small holes in the IC that extend downward from M2 layer 302 to the M3 layer 402, so that the holes traverse the non-conductive layer between M2 and M3. Each such hole is filled with a conductive material, to form a via link 308a or 308b.

Referring further to FIG. 3, there are shown sets of end connectors 310a and 310b respectively formed on M2 metal layer 302. Each of the end connectors 310a and 310b comprises a trace of conductive material of the type used to form linear traces 304a-k, although each of the connectors 310a and 310b is substantially wider than the traces 304a-k. The wider trace is needed to add multiple vias to reduce the resistance between layers. The end connectors 310a are respectively positioned in a linear array 312a, in spaced apart relationship, wherein linear array 312a is in parallel relationship with each of the linear traces 304a-k. The connectors 310b are similarly positioned in a linear array 312b, which is in parallel relationship with traces 304a-k and linear array 312a. FIG. 3 shows each of the linear traces 304a-k positioned between the arrays 312a and 312b. The functions of end connectors 310a and 310b and of via links 308a and 308b are described hereinafter.

Resistor component 400 shown in FIG. 4 is generally very similar to resistor component 300 described above. Thus, component 400 includes linear traces 404a-k in parallel spaced-apart relationship with one another, each trace 404a-k being substantially identical to a trace 304a-k of component 300. Moreover, resistor component 400 is formed on M3 metal layer 402 so that elements thereof lie directly beneath elements of resistor component 300. This allows certain elements of components 300 and 400 to mate or be joined with one another, as described hereinafter. It is to be understood, however, that respective linear traces 404a-k are placed on M3 layer 402 so that they are each oriented in orthogonal relationship with each of the traces 304*a-k* on M2 layer 302.

It is to be understood further that in other embodiments of the invention the traces 404*a-k* may have a different orientation with respect to traces 304*a-k*. For example, the traces 404*a-k* could be in parallel relationship with traces 304*a-k*, or could lie at any specified angle thereto.

Referring further to FIG. 4, there is shown an output link 406 formed on M3 layer 402 that is connected to an end of linear trace 404*a*. Each of the other ends of traces 404*a-k* is connected to a via link 408*a* or 408*b*, which are both similar or identical to via links 308*a* and 308*b* described above. Accordingly, each via link 408*a* and 408*b* comprises a small amount of conductive material that fills a hole extending from layer 402 upward to layer 302. More particularly, two via links 408*a*, from two adjacent traces 404*a-k*, extend upward from layer 402 into electrical contact with each of the end connectors 310*a*. For example, the via links 408*a* extending from traces 404*b* and 404*c* are both in contact with the uppermost end connector 310*a* of array 312*a*, as viewed in FIG. 3. Thus, linear traces 404*b* and 404*c* are connected together at their leftward ends, as viewed in FIG. 4. Similarly, the via links 408*b* of linear traces 404*a* and 404*b* are both in contact with the uppermost end connector 310*b* of array 312*b*, as viewed in FIG. 3. The traces 404*a* and 404*b* are thereby connected together at their rightward ends, as viewed in FIG. 4. Generally, the via links 408*a* and 408*b* and end connectors 310*a* and 310*b* collectively act to join linear traces 404*a-k* into a continuous electrical path, extending from output link 406 to the end connector 310*b* that is connected to the rightward end of linear trace 404*k*, as viewed in FIG. 4. Such end connector is more specifically referenced in FIG. 3 as end connector 310*b'*, to enhance recognition.

FIG. 4 further shows sets of end connectors 410*a* and 410*b* respectively formed on M3 metal layer 402. The end connectors 410*a* and 410*b* are very similar in construction and operation to end connectors 310*a* and 310*b* described above. Connectors 410*a* and 410*b* are positioned in linear arrays 412*a* and 412*b*, respectively. The arrays 412*a* and 412*b* are in parallel spaced-apart relationship with the linear traces 404*a-k*, which are positioned between the two arrays 412*a* and 412*b*.

It is to be understood that each of the end connector links 410*a* is positioned to engage two of the via links 308*a* extending downward from the M2 layer, as described above, to establish electrical contact therewith. For example, the via links 308*a* of linear traces 304*b* and 304*c* are both in contact with the leftmost end connector 410*a* of array 412*a*, as viewed in FIG. 4. Thus, linear traces 304*b* and 304*c* are connected together at their upper ends, as viewed in FIG. 3. Similarly, the via links 308*b* of linear traces 304*a* and 304*b* are both in contact with the leftmost end connector link 410*b* of array 412*b*, as viewed in FIG. 4. The traces 304*a* and 304*b* are thereby connected together at their lower ends, as viewed in FIG. 3. More generally, the via links 308*a* and 308*b* and end connectors 410*a* and 410*b* collectively act to join linear traces 304*a-k* into a continuous electrical path, extending from input link 306 to the end connector 410*b* that is connected to the lower end of trace 304*k*, as viewed in FIG. 3. Such end connector is more specifically referenced in FIG. 4 as 410*b'*, to enhance recognition.

Figure 5:
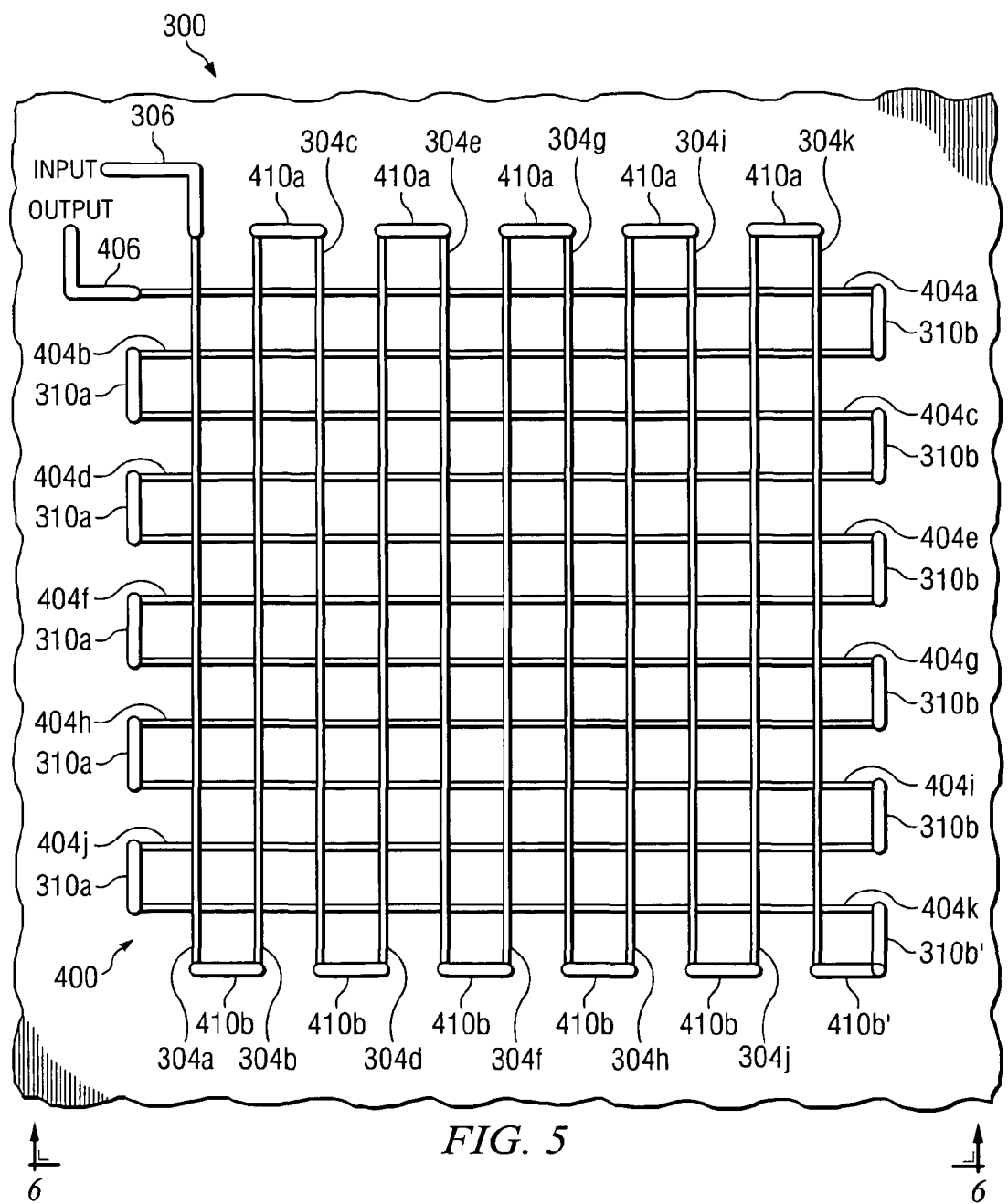
FIG. 5 is an overhead view showing the components of FIGS. 3 and 4 combined to form a complete thermal sensor in accordance with an embodiment of the invention, wherein the IC layers between the components have been removed.

Referring to FIG. 5, there is shown resistor component 300 positioned over component 400, with the M2 layer 302 and nonconductive layer removed. Thus, FIG. 5 shows the continuous electrical path of resistor component 300, extending from input link 306 to end connector 410*b'*, together with the continuous electrical path of resistor component 400, extending from end connector 310*b'* to output link 406. It will be seen that the two components 300 and 400 can be readily joined to form a single conductive path having a resistance, by providing an electrical connection between end connectors 310*b'* and 410*b'*.

Figure 6:
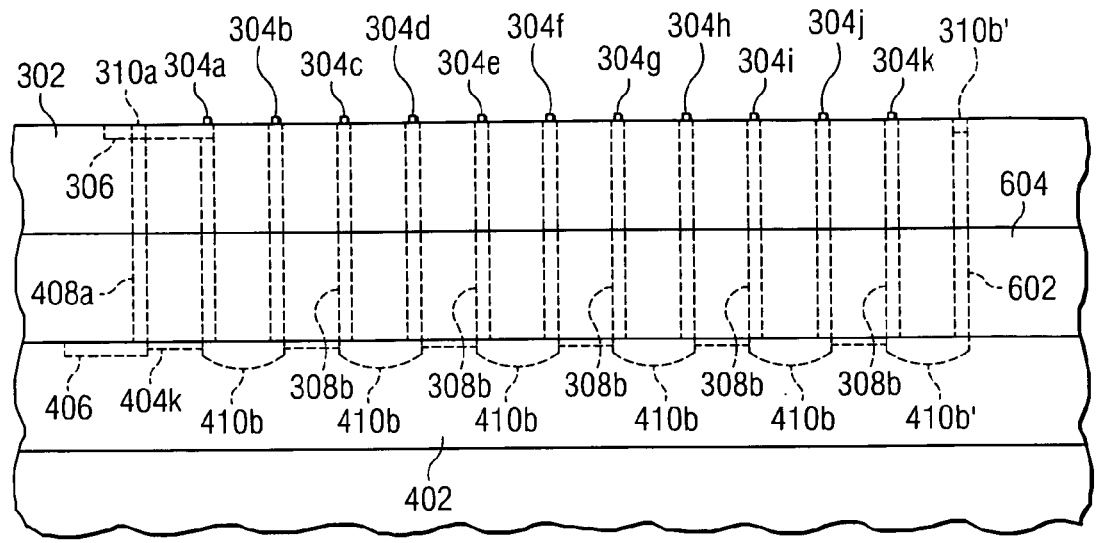
FIG. 6 is an end view taken along lines 6-6 of FIG. 5, with the IC layers between the components inserted.

FIG. 6 shows a via link 602 extending between end connector 310*b'* in layer 302 and end connector 410*b'* in layer 402, in order to establish the desired connection. Via link 602 is substantially identical to via links 308*a* and 308*b* and 408*a* and 408*b*, described above. FIG. 6 is a side view of the resistor components 300 and 400 shown in FIG. 5, wherein M2 layer 302 and nonconductive layer 604 are inserted between the two components. Accordingly, via link 602 is seen to extend through such layers, between end connectors 310*b'* and 410*b'*.

FIG. 6 further shows linear traces 304*a-k*, connected to respective end connectors 410*b* by means of via link 308*b*. FIG. 6 depicts trace 404*k* connected to an end connector 310*a* through a via link 408*a*, and also shows input link 306 and output link 406.

Figure 7:
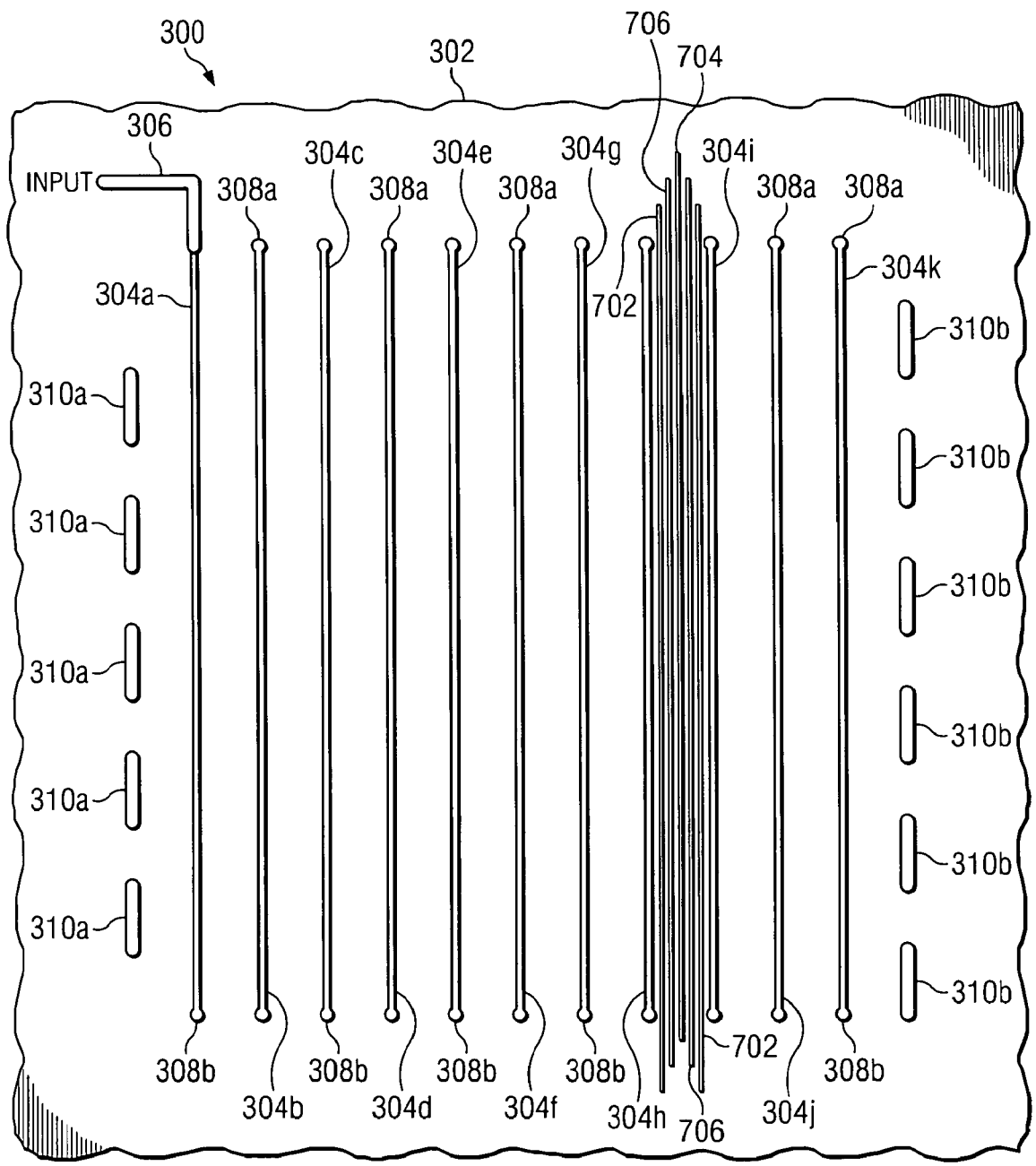
FIG. 7 is an overhead view showing the component of FIG. 3 together with a conductor channel and conductors that are unrelated to the thermal sensor of FIG. 5.

Referring to FIG. 7, there is shown sensor resistance component 300 as described above, wherein a linear channel 702 has been formed in M2 layer 302. More particularly, channel 702 has been formed between linear traces 304*h* and 304*i*, in parallel relationship therewith. Channel 702 provides a passage for a wire or conductive trace 704 that is connected to carry signal information for an IC circuit or function, wherein the circuit or function is unrelated to the thermal sensor of component 300. FIG. 7 further shows shield wires 706 contained in the channel 702, to shield wire 704 from surrounding interference. Thus, FIG. 7 illustrates a significant advantage of the invention, in that embodiments thereof may be readily adapted to avoid blocking signal paths and the routing of information needed for other IC operations.

Figure 8:
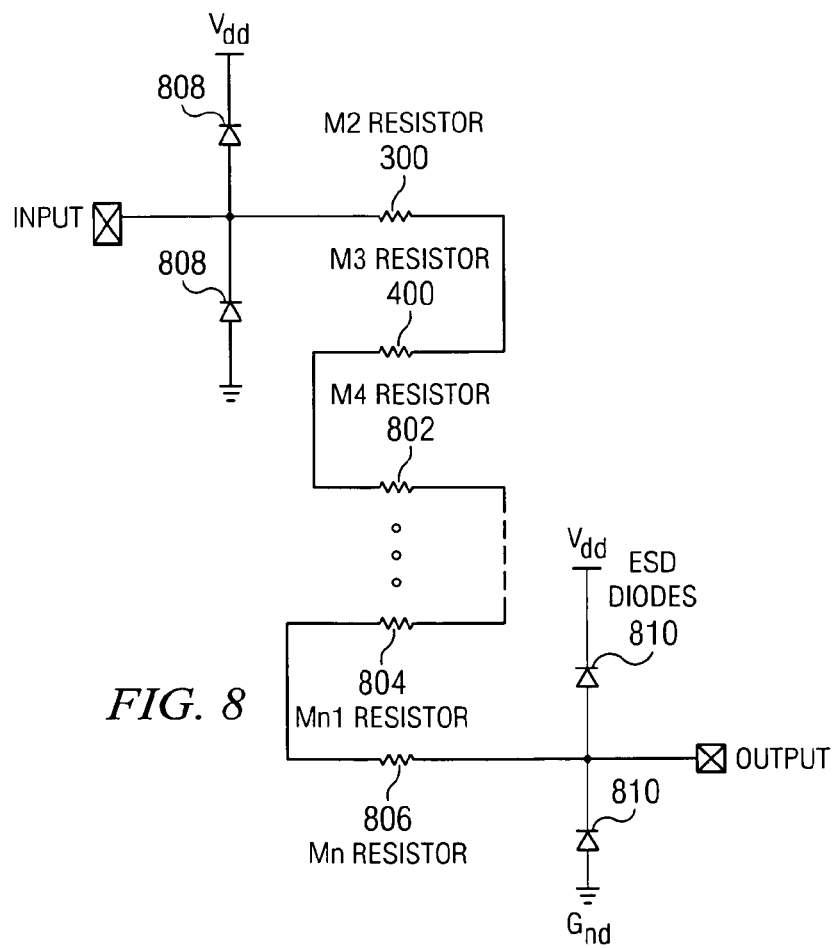
FIG. 8 is a circuit diagram showing an embodiment of the invention in a generalized form.

Referring to FIG. 8, there is shown a generalized embodiment of the invention. As described above, resistor components such as 300 and 400, on layers M2 and M3, respectively, may be joined together to form a complete thermal sensor. In addition, other resistor components for the sensor, such as components 802-806, may be located on other layers of the multi-layered IC and be interconnected serially with components 300 and 400. In one arrangement, the components placed on n metal layers could alternate between resistor components such as 300, and orthogonal resistor components such as 400. In an alternative arrangement, the resistor components on adjacent layers could have linear traces that were aligned in parallel relationship or at any selected angle with each other, rather than in orthogonal relationship. In yet other arrangements, different layers could have resistors with different numbers of linear traces, or could have different spacing between traces.

Thus, embodiments of the invention may be readily adapted to meet varying requirements. For example, for the same value of resistance, the sensor wire can be made longer and wider, thus making the sensor wire less susceptible to self heating. Since wiring channels are no longer blocked, the sensor circuit can be integrated with one or more similar temperature-sensitive macros that are daisy-chained together, or connected in series, so that the temperature of critical circuits can be measured. Since utilization of metal might be more intense on one layer than another, the thermal sensor of the invention could be adapted to avoid use of the highly utilized layers, without impacting the links of the over-all sensor resistor.

Referring further to FIG. 8, there are shown additional elements for the circuit of the generalized thermal sensor embodiment. ESD diodes 808 and 810 are connected to the sensor input and output, respectively. The diodes 808 and 810 are respectively coupled between a voltage source ($V_{dd}$) and ground (Gnd).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Thermal sensor apparatus for monitoring temperature in a multi-layered semiconductor package, said sensor apparatus comprising:

one or more first resistor components, each of said first resistor components positioned in a different layer, and each first resistor component comprising a plurality of first linear members aligned in parallel relationship, and further comprising at least one linear array of first end connectors aligned in parallel relationship with the first linear members;

a second resistor component corresponding to each of said first resistor components, each second resistor component positioned in a layer adjacent to the layer of its corresponding first resistor component, each of said second resistor components comprising a plurality of second linear members aligned in parallel relationship and at least one linear array of second end connectors aligned in parallel relationship with the second linear members;

means for linking the first linear members of a first resistor component to second end connectors of the corresponding second resistor component, in order to connect the first linear members into a first conductive path;

means for linking the second linear members of a second resistor component to first end connectors of the corresponding first resistor component, in order to connect the second linear members into a second conductive path;

means for serially connecting each of said first and second conductive paths into a single continuous conductive path; and a device responsive to electric current sent through said continuous path for determining temperature proximate to said continuous path from said path resistance.

2. The sensor apparatus of claim 1, wherein:

the second linear conductive members of a second resistor component are aligned in orthogonal relationship with the first linear members of the corresponding first resistor component.

3. The sensor apparatus of claim 1, wherein:

the second linear conductive members of a second resistor component are aligned in parallel relationship with the first linear members of the corresponding first resistor component.

4. The sensor apparatus of claim 1, wherein:

the second linear conductive members of a second resistor component are aligned at a specified angle with respect to the linear members of the corresponding first resistor component.

5. The sensor apparatus of claim 1, wherein:

the number of said first linear members of at least one of said first resistor components is different from the number of second linear members of the corresponding second resistor component.

6. The sensor apparatus of claim 1, wherein:

the spacing between respective first linear members of at least one of said first resistor components is different from the spacing between the respective second linear members of the corresponding second resistor component.

7. The sensor apparatus of claim 1, wherein:

said resistance of said continuous conductive path varies linearly with variation in the temperature of said continuous path, over a specified temperature range.

* * * * *